United States Patent
Qiang (10) Patent No.: US 9,894,511 B2
(45) Date of Patent: Feb. 13, 2018

(54) METHODS AND APPARATUSES FOR AUTOMATIC PROVISIONING OF EXTERNAL IDENTIFIERS USED FOR MACHINE TYPE DEVICES IN A 3GPP NETWORK

(71) Applicant: Telefonaktiebolaget L M Ericsson (publ), Stockholm (SE)

(72) Inventor: Zu Qiang, Kirkland (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 830 days.

(21) Appl. No.: 14/016,459

(22) Filed: Sep. 3, 2013

(65) Prior Publication Data
US 2014/0066047 A1 Mar. 6, 2014

Related U.S. Application Data

(60) Provisional application No. 61/696,237, filed on Sep. 3, 2012.

(51) Int. Cl.
*H04M 3/00* (2006.01)
*H04W 8/22* (2009.01)
*H04W 4/00* (2009.01)

(52) U.S. Cl.
CPC ............. *H04W 8/22* (2013.01); *H04W 4/001* (2013.01); *H04W 4/005* (2013.01)

(58) Field of Classification Search
CPC ..... H04W 4/005; H04W 88/02; H04W 12/04; H04W 72/042; H04W 12/06; H04W 76/023; H04W 76/027
See application file for complete search history.

(56) References Cited

U.S. PATENT DOCUMENTS

| | | | |
|---|---|---|---|
| 2007/0050365 A1* | 3/2007 | Laitinen | H04L 63/08 |
| 2013/0016657 A1* | 1/2013 | Muhanna | H04W 4/005 370/328 |

(Continued)

OTHER PUBLICATIONS

3rd Generation Partnership Project, 3GPP TS 23.401 V11.1.0 (Mar. 2012); 3rd Generation Partnership Project; Technical Specification Group Services and System Aspects; General Packet Radio Service (GPRS) enhancements for Evolved Universal Terrestrial Radio Access Network (E-UTRAN) access (Release 11). Mar. 2012. pp. 1-284.

(Continued)

*Primary Examiner* — Khalid Shaheed
(74) *Attorney, Agent, or Firm* — Murphy, Bilak & Homiller, PLLC (57) ABSTRACT

In one aspect, the teachings herein propose a procedure provided by an appropriately configured 3GPP Core Network (CN), which allows External Identifiers to be provisioned dynamically by the 3GPP operator or an MTC service provider, using the existing 3GPP M2M architecture. As such, these teachings can be understood as providing for automatic activation, modification, deactivation, etc., of MTC service subscriptions or services, using protocol-based signaling between the involved entities, e.g., between a 3GPP HSS and an MTC Server (a Services Capability Server or SCS) and/or an MTC Bootstrapping Server that provides for MTC subscription activations, modifications, cancellations, etc.

16 Claims, 10 Drawing Sheets

(56) References Cited

U.S. PATENT DOCUMENTS

| | | | | |
|---|---|---|---|---|
| 2013/0083653 A1* | 4/2013 | Jain | | H04W 4/005 370/230 |
| 2013/0155954 A1* | 6/2013 | Wang | | H04W 4/005 370/328 |
| 2013/0273855 A1* | 10/2013 | Cherian | | H04W 4/005 455/68 |
| 2013/0303206 A1* | 11/2013 | Starsinic | | H04W 4/12 455/466 |

OTHER PUBLICATIONS

3rd Generation Parternship Project, "3GPP TR 23.888 V1.6.1 (Feb. 2012)," 3rdGeneration Partnership Project; Technical Specification Group Services and System Aspects; System Improvements for Machine-Type Communications (Release 11). Feb. 2012. pp. 1-165.
3rd Generation Partnership Project, "3GPP TS 23.682 V11.0.0 (Mar. 2012)," 3rd Generation Partnership Project; Technical Specification Group Services and System Aspects; Architecture enhancements to facilitate communications with packet data networks and applications (Release 11). Mar. 2012. pp. 1-24.
3rd Generation Partnership Project, "3GPP TS 22.368 V11.4.0 (Mar. 2012)," 3rd Generation Partnership Project; Technical Specification Group Services and System Aspects; Service requirements for Machine-Type Communications (MTC); Stage 1 (Release 11). Mar. 2012. pp. 1-25.
Unknown, Author, "3GPP TR 33.868 V0.9.0 (Jul. 2012)", 3rd Generation Partnership Project; Technical Specification Group Services and System Aspects; Security aspects of Machine-Type Communications; (Release 11); Jul. 2012, pp. 1-58.
Unknown, Author, "3GPP TS 33.220 V11.2.0 (Mar. 2012)", 3rd Generation Partnership Project; Technical Specification Group Services and System Aspects; Generic Authentication Architecture (GAA); Generic Bootstrapping Architecture (GBA) (Release 11); Mar. 2012, pp. 1-91.
Unknown, Author, "3GPP TS 33.223 V10.0.0 (Mar. 2011)", 3rd Generation Partnership Project; Technical Specification Group Services and System Aspects; Generic Authentication Architecture (GAA); Generic Bootstrapping Architecture (GBA) Push function (Release 10); Mar. 2011, pp. 1-23.

* cited by examiner

FIG. 7
SUBSCRIPTION MODIFICATION

METHODS AND APPARATUSES FOR AUTOMATIC PROVISIONING OF EXTERNAL IDENTIFIERS USED FOR MACHINE TYPE DEVICES IN A 3GPP NETWORK

RELATED APPLICATIONS

This application claims priority from the U.S. provisional patent application filed on 3 Sep. 2012 and assigned Application No. 61/696,237, which is incorporated herein by reference.

TECHNICAL FIELD

The present invention generally relates to wireless communication networks, and particularly relates to the provisioning of Machine-Type-Communication (MTC) devices for operation in conjunction with such networks.

BACKGROUND

In the context of wireless communication networks based on Third Generation Partnership Project (3GPP) Technical Specifications, a device that is configured for Machine Type Communication (MTC) through a 3GPP network with an MTC Server or other machine type devices is referred to as a "machine type device," or, equivalently, an "MTC type device." More than one machine type device may be represented by one 3GPP User Equipment (UE), in the sense that the UE may act as a gateway or router for multiple machine type devices that are communicatively connected through the UE and/or the UE may run multiple MTC applications or services, each representing a logically different machine type device. Further in this context, the MTC Server will be understood as a type of "Services Capability Server" or SCS.

3GPP is currently investigating enhancements for machine type devices in Release 12 of the controlling 3GPP Technical Specifications.

While machine type devices are characteristically expected to have low mobility (in most but not all cases) and to engage in infrequent or low date rate communication, there is also an expectation that potentially vast numbers of machine type devices will be linked to MTC services or other machine type devices through a supporting 3GPP network. Consequently, even if each machine type device generates a relatively small amount of signaling, traffic associated with MTC services may impose significant loading on the network.

In one aspect of supporting MTC within the 3GPP network context, 3GPP Release 11 defined a new identifier, referred to as the "External Identifier." The External Identifier is specified in 3GPP TS 23.003. Other Technical Specifications of interest include: 3GPP TS 23.401 v11.1.0, 3GPP TS 23.888 v1.6.1, 3GPP TS 23.682 v11.0.0, 3GPP TS 22.368 v11.4.0

A 3GPP UE with one International Mobile Subscriber Identity (IMSI) may have one or several globally unique External Identifier(s) that are stored in the associated "user subscription" within the Home Subscriber Server or HSS in the associated user's home network. The intention is that each External Identifier can be used to identify a particular one of the machine type devices associated with the UE. However, it should be noted that use of External Identifiers is not restricted to MTC applications.

With the above usage of External Identifiers, a single 3GPP UE is associated with more than one External Identifier, in dependence on the number of machine type devices it is associated with. These identifiers have meaning within the "machine domain," meaning that they are used to identify machine type devices for purposes of MTC services. However, as far as the 3GPP network is concerned, an associated International Mobile Subscriber Identity or IMSI identifies the UE for purposes of 3GPP bootstrapping. Here "3GPP bootstrapping" refers to the process of the UE attaching to the 3GPP network, which involves authenticating and authorizing the UE, for establishing the connection and its associated radio bearers.

Those of ordinary skill in the art will recognize that a 3GPP UE is associated with an owner or other authorized user—generically referred to as a "user"—and that the user in general will have had to establish a user subscription with a particular 3GPP network operator. The 3GPP network associated with the subscription is referred to as the user's "home network" and that network will include a Home Subscriber Server (HSS) or equivalent, which securely stores user subscriptions, including the associated IMSIs, for use in 3GPP bootstrapping of UEs attempting to connect to the home network directly, or UEs connecting to visited networks, wherein the visited networks communicate back to the home network for authorization, billing, etc.

Consequently, there are two types of subscriptions at issue regarding MTC services running on a 3GPP UE: (1) 3GPP network or "user" subscriptions, and (2) MTC service subscriptions. For a given UE, its associated 3GPP network subscription must be active and validated before the UE is permitted to attach to the 3GPP network and establish radio bearers for communication services, including any MTC services. However, to the extent that the UE supports one or more machine type devices, engaging in MTC services requires not only successful attachment and coupling through the 3GPP network, but also activation and/or validation of one or more associated MTC service subscriptions.

Currently, in 3GPP Release 11, there is an assumed static relationship between the External Identifiers used by the MTC service provider(s) to identify the machine type devices associated with a UE. Because the IMSI associated with the UE is not provided externally, it is expected that the Home Subscriber Server (HSS) or equivalent entity in the user's home 3GPP network will store the External Identifiers in the associated user subscription, along with the IMSI. However, the mechanisms used for activation and/or deactivation of MTC subscriptions and MTC features lie outside the scope of 3GPP.

Such an approach consequently imposes significant provisioning burdens from the perspectives of the 3GPP network operators and the MTC service providers. One problematic aspect is that 3GPP network operators understandably safeguard IMSIs as a matter of network integrity and fraud prevention, and generally do not make IMSIs available to external service providers, including MTC service providers. Consequently, MTC Servers generally do not have access to IMSIs as a means of identifying UEs involved in the MTC services they support, nor do HSSs within 3GPP networks have any mechanism for associating External Identifiers with a particular IMSI, absent potentially burdensome manual provisioning of such associations.

Such provisioning can be prohibitively burdensome because there may be many External Identifiers for individual UEs, given that one UE may have multiple machine type devices associated with it. As a further complication, External Identifiers may be added, modified, or deleted, for a given UE, reflecting MTC service changes. Still further, when a UE attaches to a 3GPP network, as identified by the associated IMSI, it may or may not want to activate all of the MTC services associated with it.

For example, a UE embedded in a vehicle has one IMSI associated with it, for 3GPP Bootstrapping, such as stored in a Subscriber Identity Module (SIM) or software-based Universal SIM. Yet this one UE may have multiple machine type devices associated with it, which correspondingly subscribe to many services, e.g. local tourist information, car software updates, car maintenance on-line checking, car emergency service notifications, web music push services, etc. At the outset of a trip, not all services should necessarily be activated. Conversely, when arriving at the trip destination, local tourist information may be necessary or at least highly desirable, which requires the activation of a corresponding service. Further along these lines, it may be desirable to deactivate all but one or two specialized services when the car is parked. As an example, vehicle software updates and car maintenance services (telematics) may be activated during the time that the car is parked.

Of course, the UE may perform an MTC registration procedure towards each of the services, and the corresponding MTC Server(s) shall try to reach the UE only for registered services. However, registration does not necessarily mean the service is always active from the UE side. Further, some services may not have any registration procedure.

Figure 1:
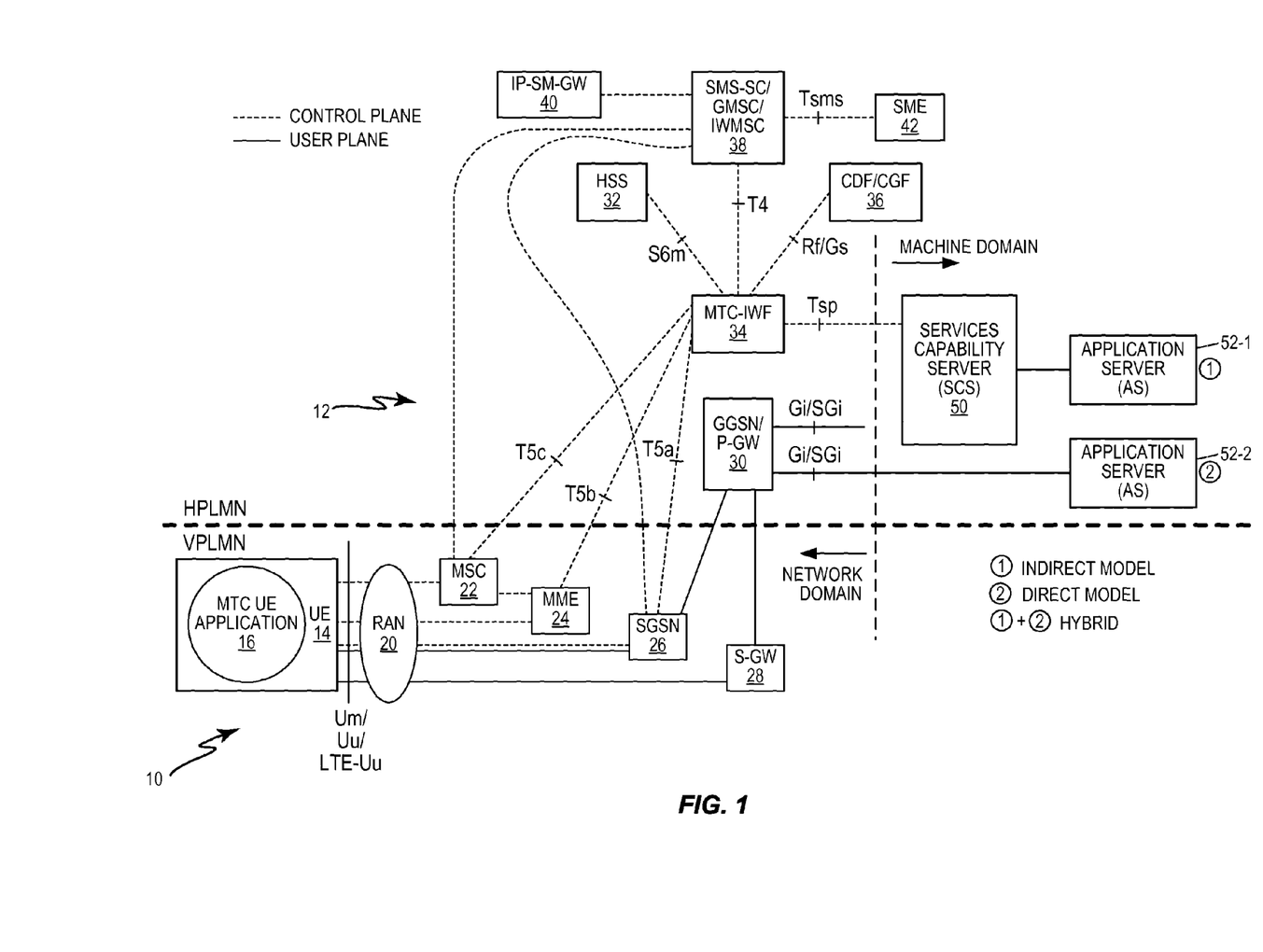
FIG. 1 is a block diagram of a known network architecture according to 3GPP specifications, for supporting MTC services, which are also referred to as M2M services.

FIG. 1 illustrates the 3GPP Architecture for supporting MTC services, which are also referred to as Machine-to-Machine or M2M services. Consequently, unless otherwise noted, the term "M2M" and "MTC" may be used interchangeably herein.

One sees a Visited Public Land Mobile Network (VPLMN) 10 and a Home Public Land Mobile Network 12 and in this example, a given UE 14 attaches to the VPLMN 10 and the VPLMN 10 communicates with the HPLMN 12 for authorization, etc. The UE 14 includes or is otherwise associated with one or more machine type devices 16, which may be M2M applications hosted on the UE 14 in a non-limiting example case. In this disclosure, machine type devices 16 are also referred to as MTC devices and/or M2M devices, and, unless otherwise noted, the reader may assume that all such terms imply a device that engages in MTC with one or more entities in the machine domain based on establishing access through a 3GPP or other such wireless communication network, e.g., the VPLMN 10 and/or HPLMN 12 shown in the diagram.

The VPLMN 10 includes a Radio Access Network (RAN) 20 having one or more of the following entities: a Mobile Switching Center (MSC) 22, a Mobility Management Entity (MME) 24, a Serving GPRS Support Node (SGSN) 26, and a Serving Gateway (S-GW) 28. Here, it will be appreciated that particular arrangement and naming convention of the entities depicted in the VPLMN 10 will depend on the particular specifications of the network, e.g., 3GPP Release 8, 9, 10, 11, etc.

The same is true for the HPLMN 12, which in this example diagram includes: a Gateway GPRS Support Node/Packet Gateway (GGSN/P-GW) 30, an HSS 32, a Machine Type Communication InterWorking Function (MTC-IWF) 34, a Charging Data Function/Charging Gateway Function (CDF/CGF) 36, a Short Message Service Service Center/Gateway Mobile Switching Center/Interworking Mobile Switching Center (SMS-SC/GMSC/IWMSC) 38, which may be associated with an IP Short Message Gateway (IP-SM-GW) 40 and a Short Message Entity (SME) 42.

The above entities may be regarded as being in or associated with the wireless communication network operator's domain—the network domain. One also sees a machine domain, which may be understood as being the domain of the M2M service provider. In the illustrated example, the machine domain includes a Services Capability Server (SCS) 50, which is also referred to as an MTC Server or an M2M Server. Further, one or more M2M Application Servers (AS) 52 will be understood as hosting or otherwise providing one or more M2M applications that are intended to use or otherwise interact with the machine type device(s) 16 in the depicted UE 14 (and, in general, with essentially any number of machine type devices 16 hosted or associated with a potentially large number of UEs 14).

In the example, one sees an AS 52-1 coupled to the MTC Server 50, and another AS 52-2 coupled to the GGSN/P-GW 30 in the network domain. The former coupling represents an example of the "Indirect Model" denoted with the encircled numeral "1" in the diagram, while the latter coupling represents an example of the "Direct Model" denoted with the encircled numeral "2" in the diagram. A combination of these models is referred to as the "Hybrid Model."

As seen in the figure, the interface Tsp is between the SCS 50 and the MTC-IWF 34. The Tsp interface is defined for the triggering function only, e.g., where the machine domain triggers communication with an MTC device 16 through the 3GPP network(s) 10, 12. The triggering function is based on the assumption that the External Identifier for the targeted MTC device 16 is already configured in the corresponding UE subscription in the HSS 32. When triggering is needed, the SCS 50 sends a triggering message that contains the External Identifier of the device 16 to the MTC-IWF 34. The MTC-IWF 34 translates the received External Identifier to the corresponding UE IMSI, based on querying the HSS 32 over the S6m interface. The MTC-IWF 34 will then send the triggering message with the IMSI over the T4/T5 interface(s).

SUMMARY

In one aspect, the teachings herein propose a procedure provided by an appropriately configured 3GPP Core Network (CN), which allows External Identifiers to be provisioned dynamically by the 3GPP operator or an MTC service provider, using the existing 3GPP M2M architecture. As such, these teachings can be understood as providing for automatic activation, modification, deactivation, etc., of MTC service subscriptions or services, using protocol-based signaling between the involved entities, e.g., between a 3GPP HSS and an MTC Server (a Services Capability Server or SCS) and/or an MTC Bootstrapping Server that provides for MTC subscription activations, modifications, cancellations, etc.

Automatic provisioning in this respect advantageously addresses the two-fold problems of maintaining IMSI security while automating the potentially burdensome provisioning of individual 3GPP network subscriptions (user subscriptions) with any number of External Identifiers, to thereby link the corresponding UEs/IMSIs with those External Identifiers, for supporting MTC services to and from those UEs. The use of a newly defined "Root Identifier" is a particular aspect of the teachings herein.

Based on the methods and apparatuses taught herein, the Root Identifier is known, or becomes known, to both the 3GPP network and to the MTC service provider entity or entities. In an example case, such entities include an MTC Server and/or an MTC Bootstrapping Server. Consequently, External Identifiers for any number of machine type devices can be activated, deactivated, modified, or otherwise updated in the MTC services domain, and then signaled to the 3GPP network (e.g., to the involved HSS) in association with the associated Root Identifier. The involved HSS, with its a priori knowledge of the Root Identifier and the associated IMSI thus uses the received Root Identifier to identify the correct IMSI/user subscription and stores the External Identifiers and/or changes thereto in the correct user subscription.

Such operation will be understood as a form of "automatic" provisioning using protocol-based signaling between entities in the 3GPP network domain, which know the IMSI of the involved M2M capable UE, and entities in the MTC services domain, which do not know the IMSI of the M2M capable UE. Advantageously, the involved 3GGP network entities link External Identifiers to the proper user subscriptions in the HSS, based on their common knowledge of the aforementioned Root Identifiers.

In this regard, the Root Identifier will be understood as an identifier that is known in both the 3GPP network domain and in the MTC services domain (the machine domain) and thus serves as a common identifier for a particular UE. As such, the Root Identifier allows the 3GPP network and the machine domains to cooperatively provision and otherwise manage External Identifiers for individual UEs by referencing the involved signaling to the commonly known Root Identifiers for those UEs. Advantageous procedures for such signaling are further set forth herein.

Of course, the present invention is not limited to the above features and advantages. Indeed, those skilled in the art will recognize additional features and advantages upon reading the following detailed description, and upon viewing the accompanying drawings.

DETAILED DESCRIPTION

In accordance with one aspect of the teachings herein, a "Root Identifier" is specified for an M2M-capable UE. Hereafter, "UE" alone will be understood as meaning an M2M capable UE, unless otherwise noted. Such UEs shall be understood as being an example of a "machine type device" relevant to the teachings herein. That term and the term "UE" should be given broad construction, to include essentially any wireless device or apparatus that is configured for MTC via a wireless network, e.g., a 3GPP network.

The Root Identifier can be a generic Identifier in the format of the External Identifiers stored in the UE or an associated 3GPP network subscription, which is also referred to as a "user subscription" and which will be understood as the subscription maintained or otherwise used by the 3GPP network to authorize or authenticate a UE or other wireless device for attachment to the 3GPP network. The Root Identifier is used by the HSS in the 3GPP network to identify a group of External Identifiers assigned to a 3GPP subscription. The Root Identifier is also used by an MTC Server, also referred to as an SCS, to identify a group of MTC Identifiers that correspond to or represent MTC devices, and is used in the Tsp-based External Identifier provisioning procedure.

In one embodiment, the Root Identifier is provisioned in the UE, and the UE is configured to transfer or otherwise indicate the Root Identifier to the 3GPP network as part of 3GPP bootstrapping (i.e., during attachment by the UE to the 3GPP network).

Thus, the HSS either receives the Root Identifier from an attaching UE, or the HSS knows the Root Identifier a priori, e.g., based on being provisioned with the Root Identifier in advance of the attachment. In either case, the HSS stores or otherwise maintains the Root Identifier of the UE in the corresponding user subscription stored in or accessible to the HSS for the UE. As such, the HSS uses the user subscription for a given UE to uniquely associate the Root Identifier of the UE with the IMSI of the UE.

The same Root Identifier is provided to or known by the involved MTC entities, e.g., by an MTC Bootstrapping Server that activates MTC service subscriptions and/or an MTC Server supporting one or more MTC services. In this manner, the External Identifiers that are generated or modified for given machine type devices can be uniquely linked to a particular UE not through use of the IMSI (which generally will not be made available outside of the 3GPP network) but rather through use of the Root Identifier of the UE, which is uniquely tied to the UE at the HSS via the known association between it and the IMSI.

Thus, the Root Identifier in at least some embodiments is stored in at least two places (not counting any provisioned storage of the Root Identifier in the UE); namely, (1) the Root Identifier for a given UE is stored in the 3GGP or user subscription maintained by the HSS of the supporting 3GPP network, where such storage uniquely associates the Root Identifier with the IMSI stored in the user subscription, and (2) the Root Identifier is also stored in the M2M domain, e.g., in the MTC services subscription(s) for the machine type devices that are associated with the UE. That storage uniquely associates the Root Identifier with the External Identifiers corresponding to the machine type devices associated with the UE.

Storing the Root Identifier in the MTC services subscription (also referred to as an M2M subscription), allows the MTC service provider to automatically provision new External Identifiers in the corresponding 3GPP subscription, modify existing External Identifiers in the 3GPP subscription, and/or otherwise delete or update External Identifiers stored in the 3GPP description. All such changes can be done automatically, using protocol-based signaling.

The HSS or SCS may use a Root Identifier Update procedure, as described herein, to inform each other of a new Root Identifier or of updates made to an existing Root Identifier.

One procedure contemplated herein is an "SCS triggered External Identifier provision procedure," which is used by the SCS to modify the UE subscription stored in the HSS. In an example implementation, the procedure includes the following steps for a given UE that is associated with one or more machine type devices.

Step 1: When an update is required for the External Identifiers stored in the UE subscription in the HSS, the SCS sends an External Identifier Provision Request message to the MTC-IWF over the Tsp interface. The Request message contains the Root Identifier associated with the UE and the External Identifier(s) which are to be added, deleted, or updated.

Step 2: The MTC-IWF forwards the received Request message to the HSS over the S6m interface.

Step 3: The HSS uses the Root Identifier to locate the UE subscription and update the subscription based on the received External Identifier Provision Request message.

Step 4: The HSS replies to the SCS via the MTC-IWF with the External Identifier Provision Response message to confirm the acceptance or rejection of the request.

A similar embodiment offers an alternative to the above procedure and includes the SCS sending a modified form of the above modification request to the HSS. Example steps of this alternative subscription modification procedure appear below.

Step 1: When an update is required for the External Identifier(s) stored in the UE subscription in HSS, the SCS sends an External Identifier Provision Request message to the MTC-IWF over the Tsp interface. The Request message shall contain the Root Identifier and a request to add/delete/update External Identifier(s) in the UE subscription of the UE associated with the Root Identifier.

Step 2: The MTC-IWF forwards the received Request message to the HSS over the S6m interface.

Step 3: The HSS uses the Root Identifier to locate the UE subscription and update the subscription based on the received External Identifier Provision Request message.

Step 4: The HSS replies to the SCS via the MTC-IWF with the External Identifier Provision Response message to confirm the acceptance or rejection of the request. If the request was to create a new External Identifier, the created External Identifier will be included in the Ack message and sent to the SCS.

Another procedure contemplated herein for implementing protocol-based, automatic provisioning and management of external identifiers in the wireless network domain is referred to as an "External Identifier provision notification procedure." This procedure is used by the HSS to inform the SCS of UE subscription updates and in an example implementation includes the below steps for a given UE associated with a corresponding UE subscription in the HSS.

Step 1: When there is an update of the External Identifier(s) stored in the UE subscription in the HSS, the HSS sends an External Identifier Provision Notification message to the MTC-IWF over the S6m interface. The Request message contains the Root Identifier and the External Identifier(s) which have been added, deleted, or updated in the UE subscription.

Step 2: The MTC-IWF forwards the received Notification message to the SCS over the Tsp interface.

Step 3: The SCS uses the Root Identifier to locate the M2M device database and update the device's External Identifier based on the received External Identifier Provision Notification message.

Step 4: The SCS replies to the HSS via the MTC-IWF, wherein the External Identifier Provision Notification Ack message confirms receipt of the Notification.

The "Root Identifier Update procedure" is another contemplated procedure and it is used by the HSS and SCS to inform each other of a newly defined Root Identifier or to indicate updates to an existing Root Identifier. In an example implementation, the procedure includes the following steps, for the case where the HSS updates the SCS.

Step 1: When an existing Root Identifier is updated, the HSS sends a Root Identifier Update Notification message to the MTC-IWF over the S6m interface. The Request message contains the existing Root Identifier (if any) and the new Root Identifier.

Step 2: The MTC-IWF forwards the received Notification message to the SCS over the Tsp interface.

Step 3: The SCS uses the received Root Identifier to locate the M2M device database and update the M2M subscription based on the received new Root Identifier.

Step 4: The SCS replies to the HSS via MTC-IWF with the Root Identifier Update Notification Ack message to confirm the Notification is received.

The following is a counterpart example of the SCS updating the HSS.

Step 1: When an existing Root Identifier is updated, the SCS sends a Root Identifier Update Notification message to the MTC-IWF over the Tsp interface. The Request message contains the existing Root Identifier (if any) and the new Root Identifier.

Step 2: The MTC-IWF forwards the received Notification message to the HSS over S6m interface.

Step 3: The HSS uses the received Root Identifier to locate the UE database and updates the 3GPP subscription, based on the received new Root Identifier.

Step 4: The HSS replies to the SCS via MTC-IWF with the Root Identifier Update Notification Ack message to confirm the Notification is received.

Another contemplated procedure is referred to as "External Identifier provisioning based on the device activation/deactivation." As specified in Release 11, the owner of an External Identifier may be the 3GPP operator or the M2M service provider, either of which may perform the device activation/deactivation procedure. Therefore, the provisioning procedure(s) include variations associated related to "Service Provider based procedures" and "Network Operator based procedures."

Figure 2:
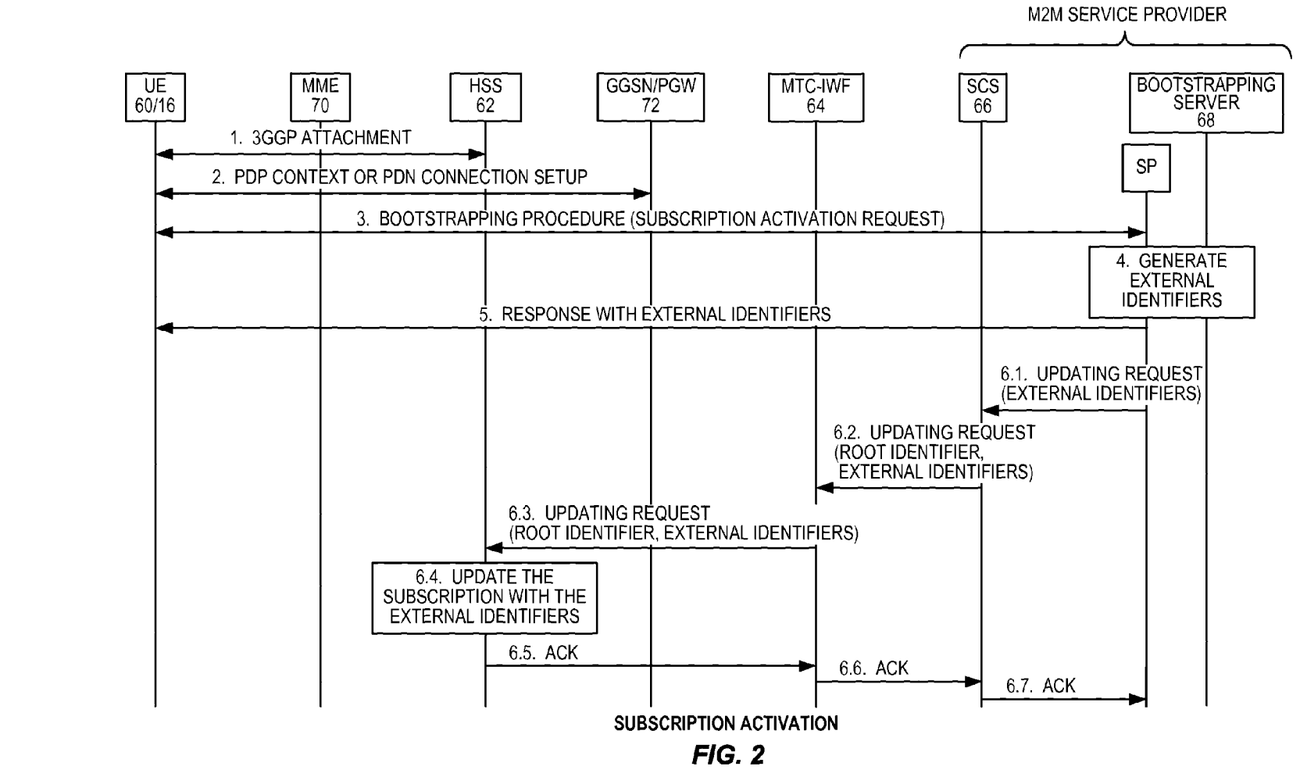
FIG. 2 is a signaling diagram of one embodiment of a method of subscription activation.

Certain aspects of the provisioning and management procedures disclosed herein depend on whether the MTC Bootstrapping server is located in the network domain or in the machine domain. FIG. 2 illustrates an example M2M "Subscription Activation" procedure where the MTC Bootstrapping server is in the machine domain. FIG. 2 can be understood as depicting an M2M subscription activation method by way of an example signal flow between the involved entities, and such entities may be understood as being the same or similar to their like-named counterparts in FIG. 1, with the exception that certain ones of them are specially adapted or otherwise configured according to the teachings herein.

Therefore, one sees a UE 60, which will be understood as having one or more machine type devices 16 associated with it. FIG. 2 also depicts an HSS 62, an MTC-IWF 64, an MTC Server or SCS 66, and an MTC Bootstrapping Server 68. For completeness regarding the signaling flow, an MME 70 and GGSN/PGW 72 are also depicted, but the HSS 62, MTC Server 66 and MTC Bootstrapping Server 68 alone or together are specially adapted according to the various embodiments presented herein.

The "Subscription Activation" procedure represented in FIG. 2 applies if a machine type device 16 associated with the UE 60 has not performed M2M subscription activation and would like to activate its M2M subscription. This activation procedure includes the following steps.

Step 1: The UE 60 associated with the machine type device 16 whose subscription is not yet active, performs the 3GPP attachment as specified in 23.060 or 23.401. The UE 60 provides its Root Identifier, if it is configured, to the 3GPP network during access authorization procedure Step 2: A PDP context or PDN connection is set up.

Step 3: The machine type device 16 performs the service bootstrapping procedure with the MTC Bootstrapping Server 68. In the M2M bootstrapping request, the machine type device 16 indicates a request for M2M subscription activation. Example details for the M2M bootstrapping procedure are known and not further described here. The UE 60 shall provide its Root Identifier, if it is configured, to the M2M service provider in the request sent for M2M subscription activation. Note that the MTC Bootstrapping Server 68 may be co-located with or functionally integrated with the MTC Server 66 of the M2M service provider.

Step 4: A group of External Identifiers is generated by the MTC Server 66, once the M2M subscription activation is accepted.

Step 5: The MTC Server 66 responds to the machine type device 16 to confirm the acceptance of the bootstrapping. Optionally, the External Identifiers may be provided to the machine type device 16 in the response message.

Step 6: The M2M Service Provider updates the UE 3GPP subscription stored in the HSS 62 by using the "SCS triggered External Identifier provision procedure" specified herein.

Figure 3:
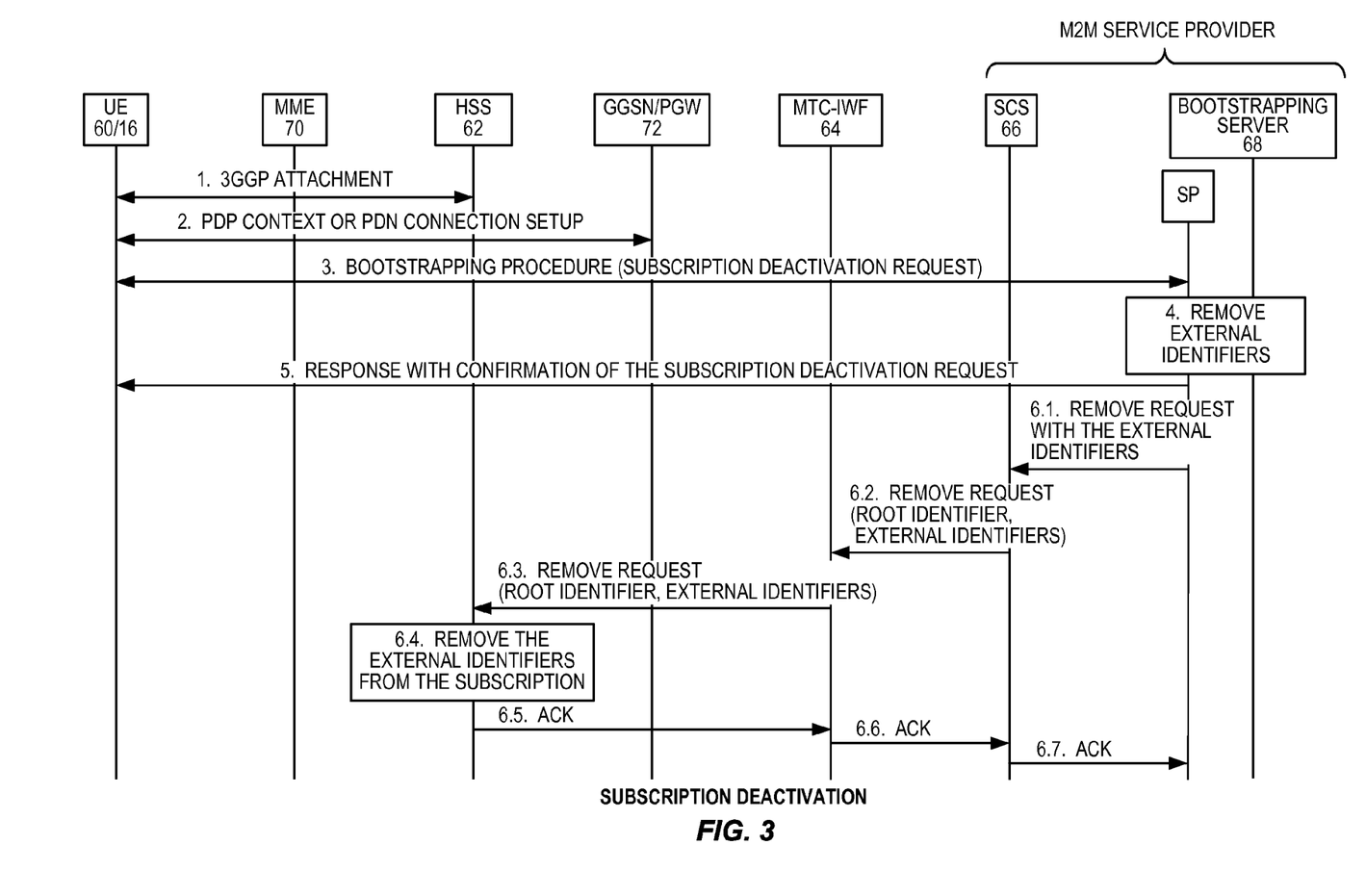
FIG. 3 is a signaling diagram of one embodiment of a method of subscription deactivation.

FIG. 3 is set in the same context as FIG. 2, i.e., where the interface with the M2M Bootstrapping Server 68 is "owned" by the M2M Service Provider. However, FIG. 3 depicts an example embodiment of a contemplated "M2M Subscription Deactivation" procedure, whereas FIG. 2 was directed to subscription activations. The method in FIG. 3 therefore applies in the case where a machine type device 16 associated with the UE 60 has an active M2M subscription established with the M2M Service Provider.

Step 1: The UE 60 performs 3GPP attachment as specified in 23.060 or 23.401.

Step 2: A PDP context or PDN connection is set up.

Step 3: The machine type device 16 that is hosted by or otherwise connected through the UE 60 performs the service bootstrapping procedure with the M2M Service Provider. In the bootstrapping request, the machine type device 16 indicates a request to deactivate its M2M subscription.

Step 4: Once the request for subscription deactivation is accepted, the corresponding External Identifiers are removed by the M2M Service Provider.

Step 5: The M2M Service Provider responds to the machine type device 16 to confirm that the Deactivation Request is accepted.

Step 6: The M2M Service Provider also updates the UE subscription stored in the HSS 62 by using the "SCS triggered External Identifier provision procedure" specified herein and exemplified in FIG. 3 in Sub-steps 6.1-6.7

Figure 4:
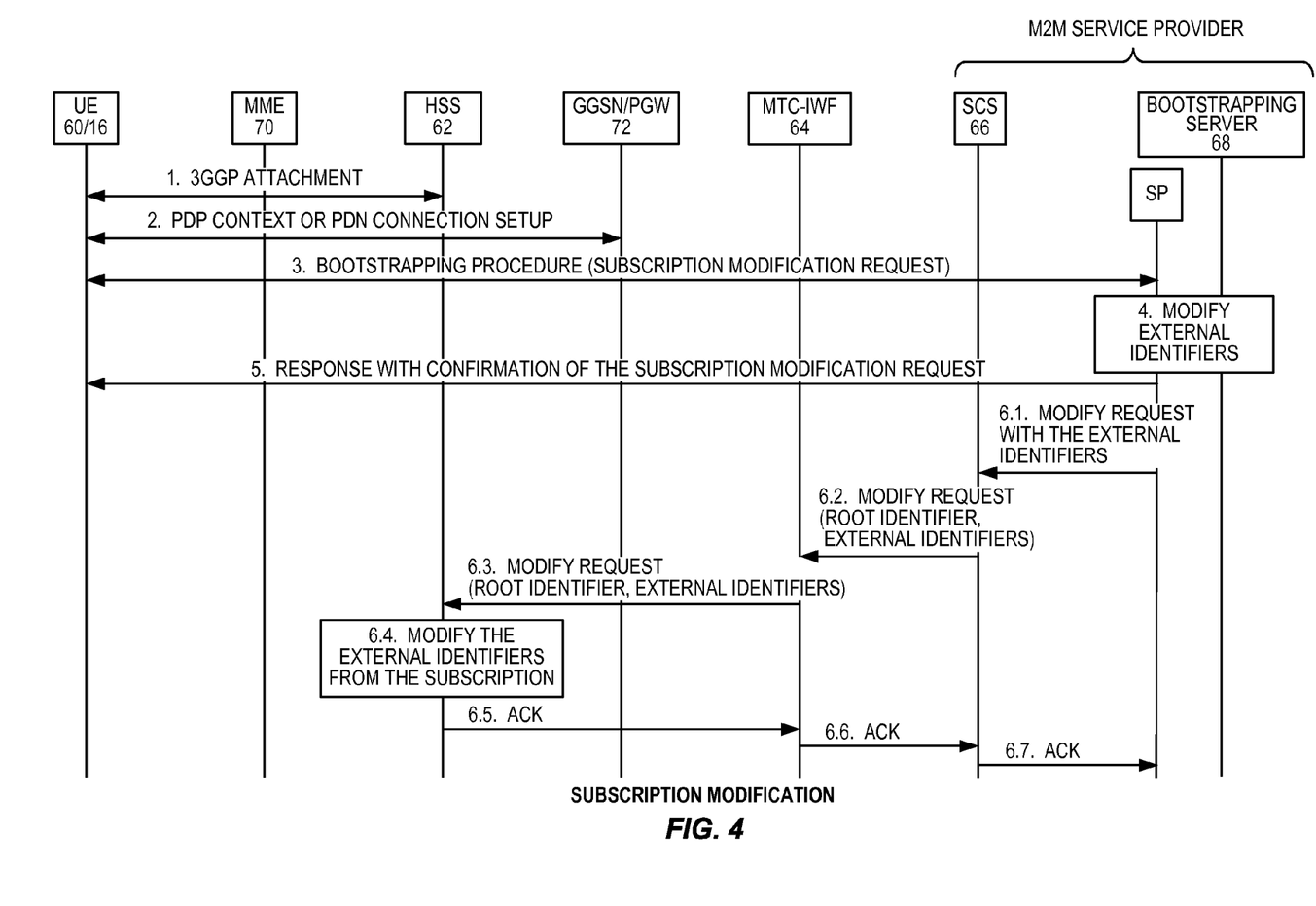
FIG. 4 is a signaling diagram of one embodiment of a method of subscription modification.

FIG. 4 is set in the same context as FIGS. 2 and 3 and it illustrates one embodiment for a method of "Subscription Modification" contemplated herein. The illustrated method or procedure applies in cases where a machine type device 16 of the UE 60 has an active M2M subscription, but would like to modify that subscription.

Step 1: The UE 60 performs the 3GPP attachment as specified in 23.060 or 23.401.

Step 2: A PDP context or PDN connection is set up.

Step 3: The machine type device 16 performs the service bootstrapping procedure with the M2M Service Provider. In the bootstrapping request, the machine type device 16 indicates the request to modify its subscription.

Step 4: Once the subscription modification request is accepted, the corresponding External Identifiers are updated by the M2M Service Provider.

Step 5: The M2M Service Provider responds to the machine type device 16 to confirm the acceptance of the subscription modification Request.

Step 6: The M2M Service Provider updates the UE subscription stored in the HSS 62 by using the "SCS triggered External Identifier provision procedure" specified herein.

Figure 5:
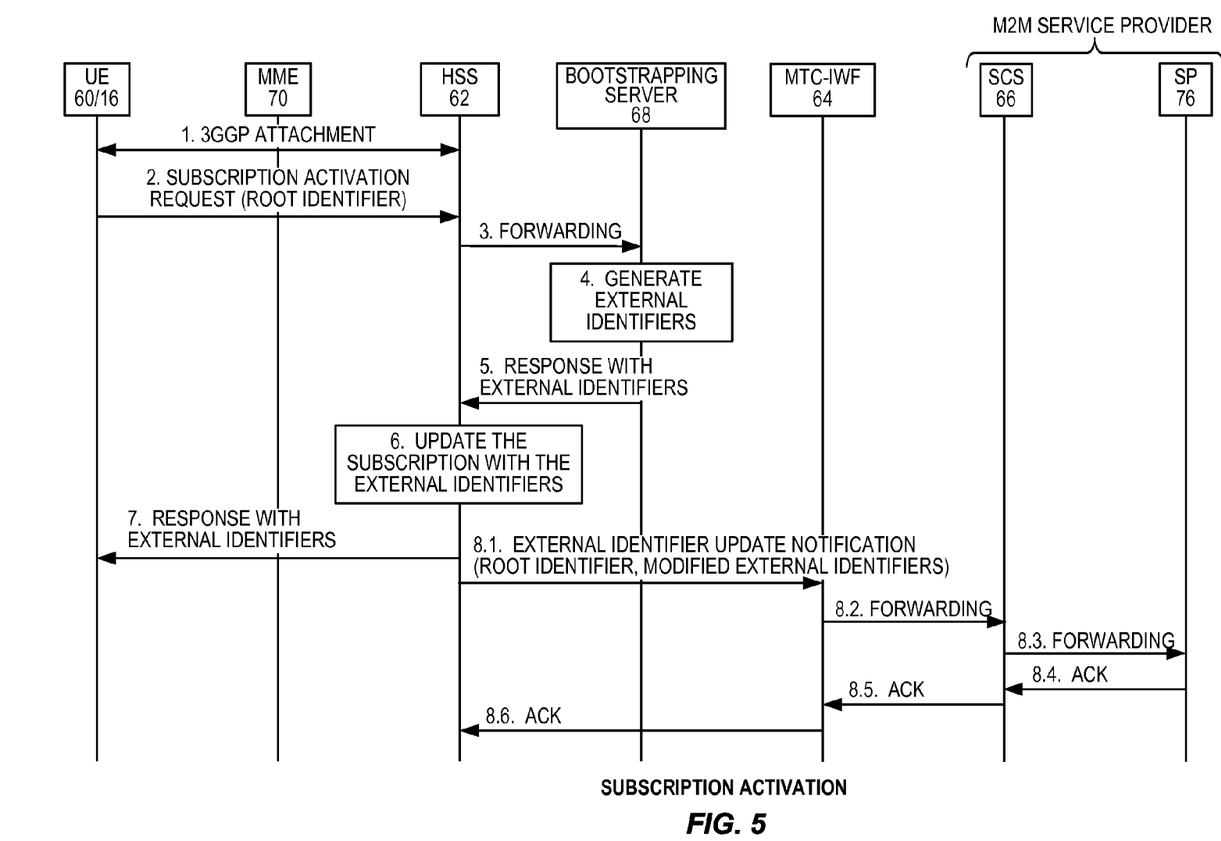
FIG. 5 is a signaling diagram of another embodiment of a method of subscription activation.

FIG. 5 illustrates an alternative "Subscription Activation" procedure that differs from that depicted in FIG. 2 in the sense that, here, the communication network operator "owns" the interface with the MTC Bootstrapping Server 68. In other words, here, the MTC Bootstrapping Server 68 resides in the domain of the communication network operator, whereas it resided in the machine domain for the procedures depicted in FIGS. 2-4

With this in mind, the Subscription Activation procedure of FIG. 5 includes the following example steps.

Step 1: The UE 60 performs the 3GPP mobility procedure (e.g. attachment) as specified in 23.060 or 23.401.

Step 2: During the attachment procedure, the UE 60 indicates the subscription activation request by providing the Root Identifier to the HSS 62 via the MME 70, if a Root Identifier has already been configured for the UE 60.

Step 3: The HSS 62 forwards the received subscription activation request to the MTC Bootstrapping Server 68, which may be collocated with the HSS 62.

Step 4: Once the subscription activation request is accepted, a group of External Identifiers is generated by the MTC Bootstrapping Server 68 based on the received Root External Identifier.

Step 5: The MTC Bootstrapping Server 68 responds back to the HSS 62, with the generated External Identifiers.

Step 6: The HSS 62 updates the corresponding UE subscription with the received External Identifiers.

Step 7: The HSS 62 responds to the UE 60 to confirm that the subscription activation is accepted, e.g., it communicates with the involved machine type device 16 hosted on or connected through the UE 60. Optionally, the External Identifiers may be provided to the UE 60 in the response message.

Step 8: The HSS 62 informs the M2M Service Provider of the newly generated External Identifiers by using the "External Identifier provision notification procedure" specified herein. In this example, the M2M Service Provider is represented as including the MTC Server 66 and one or more Service Provider (SP) nodes 76, e.g., application server nodes.

Figure 6:
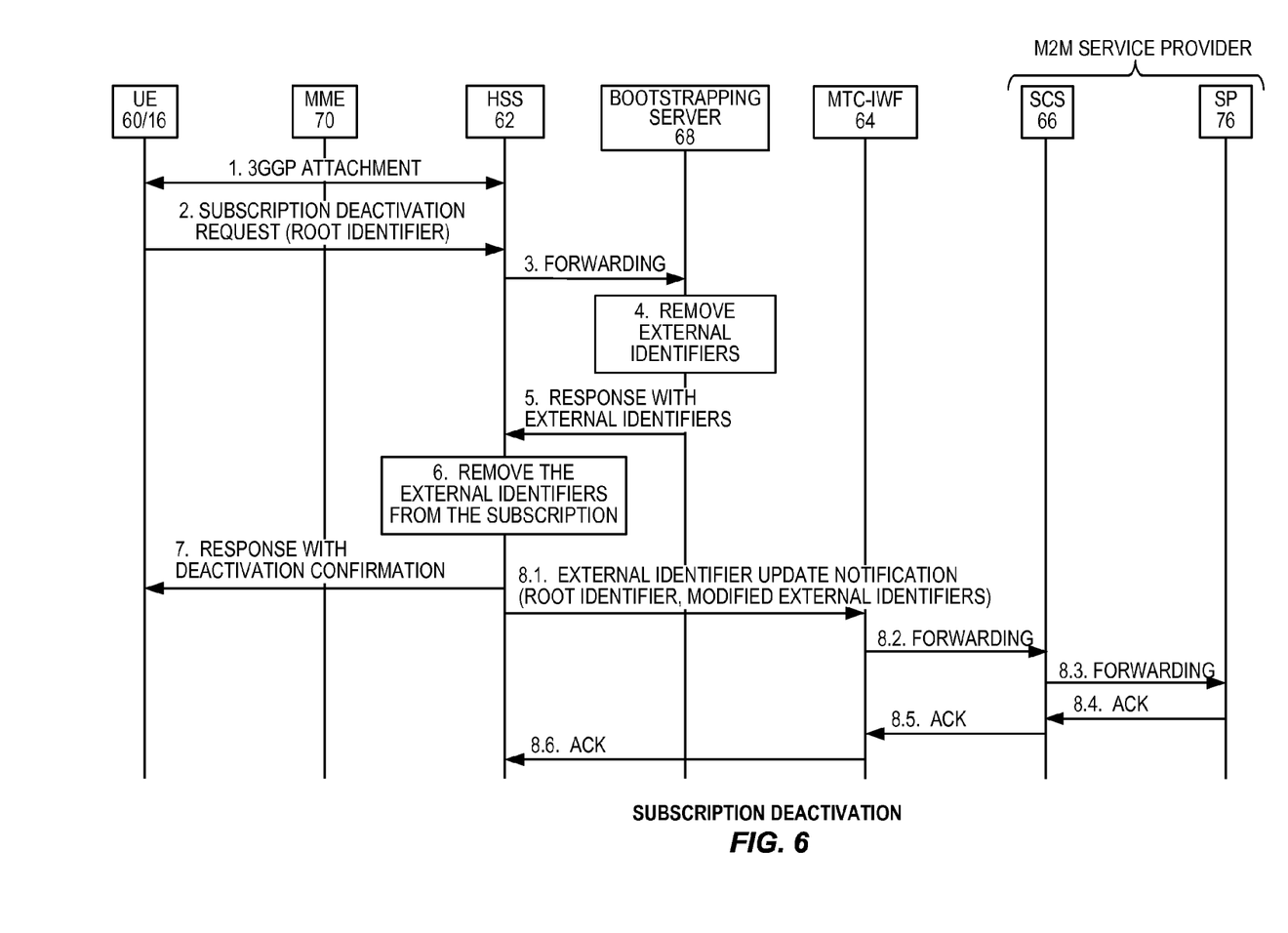
FIG. 6 is a signaling diagram of another embodiment of a method of subscription deactivation.

FIG. 6 is presented in the same context as FIG. 5, i.e., the MTC Bootstrapping Server 68 resides in the communication network operator's domain, rather than in the machine domain of the M2M Service Provider. However, FIG. 6 presents a "Subscription Deactivation" method or procedure. The contemplated procedure includes the following steps.

Step 1: A machine type device 16 associated with the UE 60 has an active M2M subscription and desires deactivation; thus, the UE 60 performs the 3GPP mobility procedure (e.g. attachment) as specified in 23.060 or 23.401.

Step 2: During the attachment procedure, the UE 60 indicates the subscription deactivation request by providing the Root Identifier.

Step 3: The HSS 62 forwards the received subscription deactivation request to the MTC Bootstrapping Server 68.

Step 4: Based on the received Root Identifier, the MTC Bootstrapping Server 68 may accept or reject the request.

Step 5: The MTC Bootstrapping Server 68 responds back to the HSS 62 with the Root Identifier and the subscription deactivation decision.

Step 6: The HSS 62 updates the UE subscription corresponding to the UE 60, based on the received subscription deactivation decision.

Step 7: The HSS 62 responds to the UE 60 to confirm the acceptance or rejection of the subscription deactivation.

Step 8: If the subscription deactivation is accepted, the HSS 62 informs the M2M Service Provider of the updated External Identifiers by using the "External Identifier provision notification procedure" specified herein.

Figure 7:
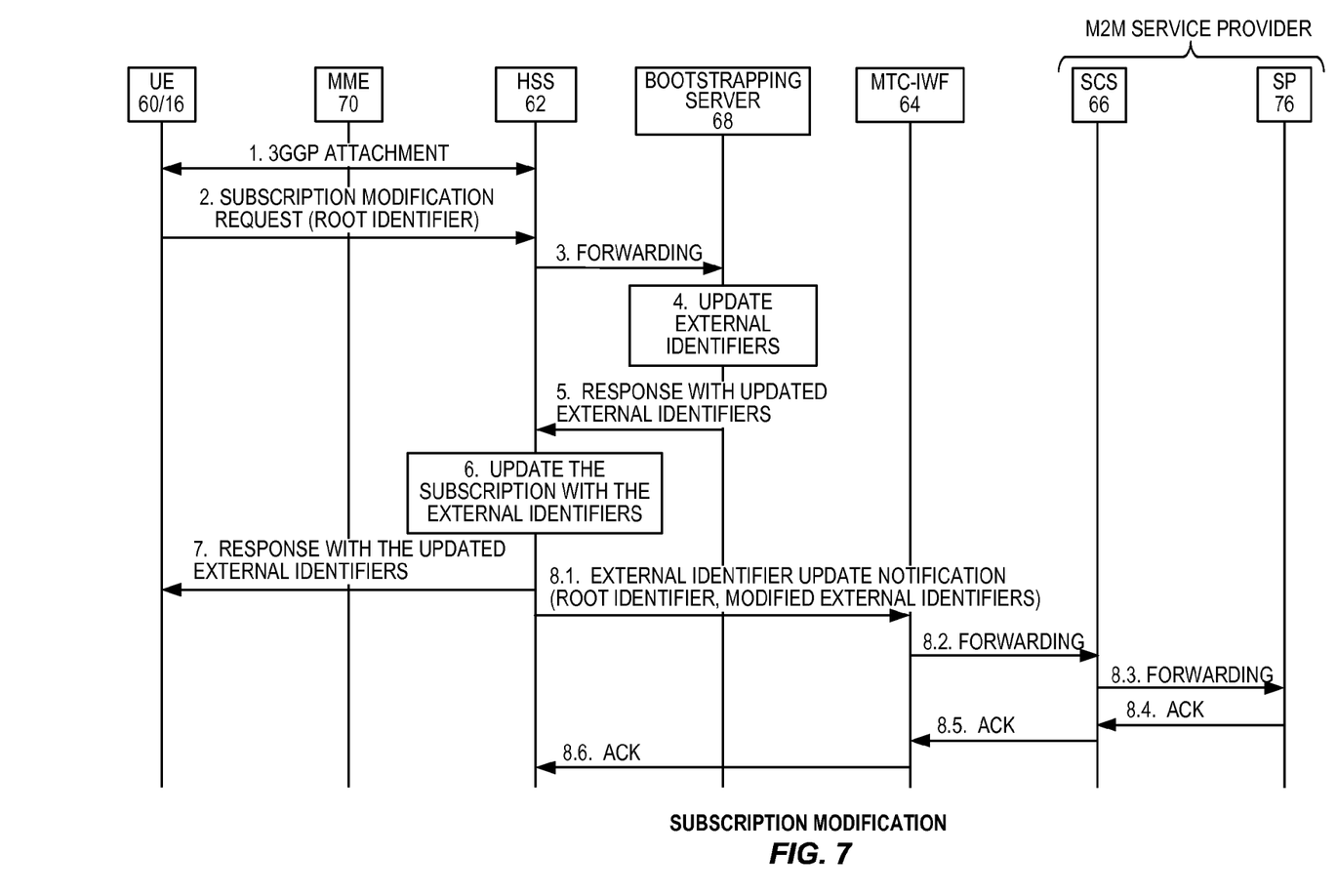
FIG. 7 is a signaling diagram of another embodiment of a method of subscription modification.

FIG. 7 is set in the same context as FIGS. 5 and 6, but illustrates an example embodiment of a "Subscription Modification" method or procedure. Thus, a machine type device 16 associated with the UE 60 has an active M2M subscription for which modification is desired and the following example steps are performed.

Step 1: The UE 60 performs the 3GPP mobility procedure (e.g. attachment) as specified in 23.060 or 23.401.

Step 2: During the attachment procedure, the UE 60 indicates the subscription modification request by providing the Root Identifier.

Step 3: The HSS 62 forwards the received subscription modification request to the MTC Bootstrapping Server 68.

Step 4: Based on the received Root Identifier, the MTC Bootstrapping Server 68 may accept or reject the request.

Step 5: The MTC Bootstrapping Server 68 responds back to the HSS 62 with the Root Identifier and the subscription modification decision.

Step 6: The HSS 62 updates the UE subscription based on the received subscription modification decision.

Step 7: The HSS 62 responds to the UE 60 to confirm the acceptance or rejection of the subscription modification request, e.g., that information is returned to the involved machine type device 16 for which the M2M subscription modification was requested.

Step 8: If the subscription modification is accepted, the HSS 62 informs the M2M Service Provider of the updated External Identifiers by using the "External Identifier provision notification procedure" specified herein.

Figure 8:
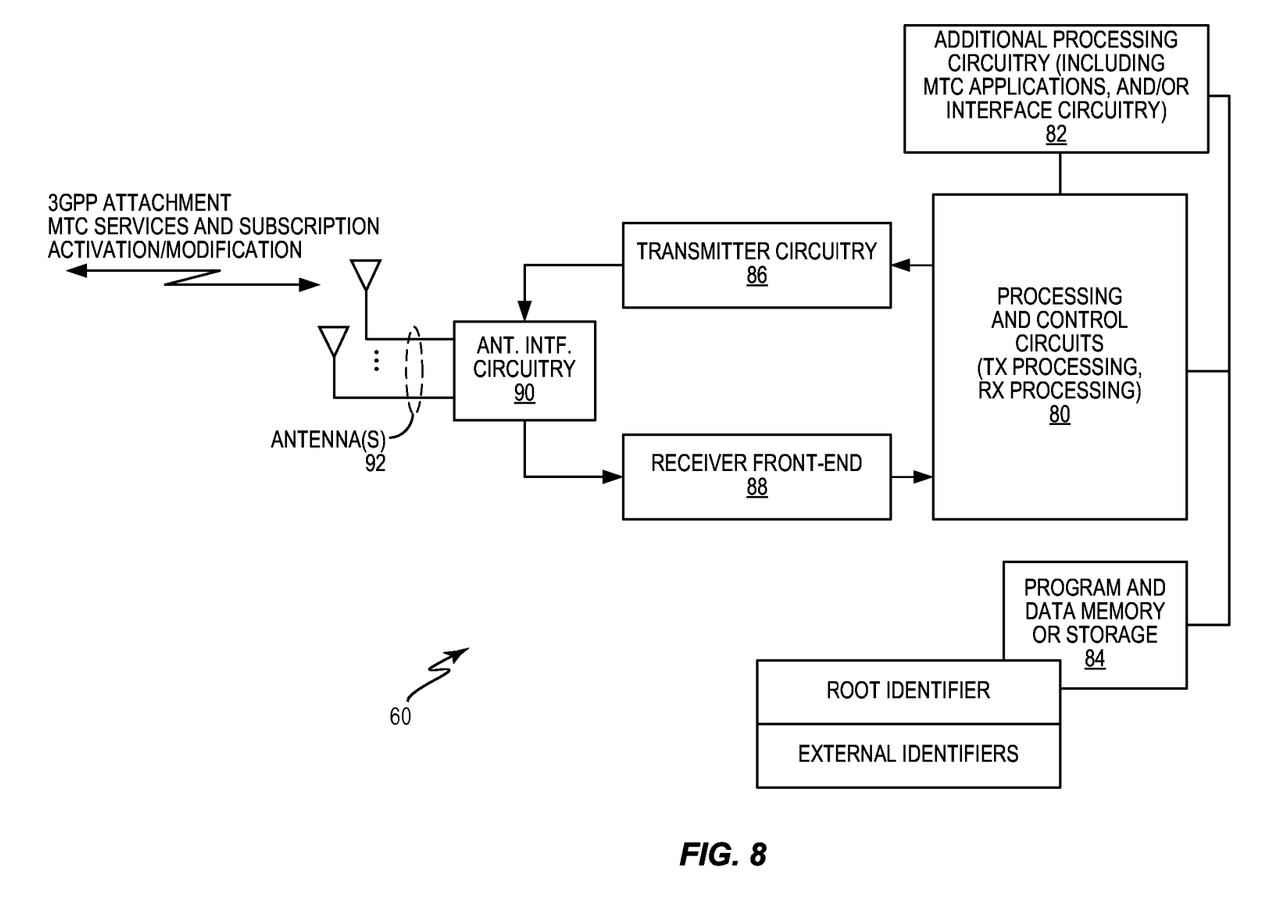
FIG. 8 is a block diagram of one embodiment of a UE.

FIG. 8 illustrates an example implementation for the above-described UE 60, and those skilled in the art will appreciate that the particular implementation adopted for a given UE will depend on its intended use and capabilities. In the example depiction, the UE 60 includes processing and control circuits 80, additional processing circuitry 82—e.g., for hosting/running machine type devices 16—program and data memory or storage 84, transmitter circuitry 86, receiver circuitry 88, antenna interface circuitry 90 and one or more receive/transmit antennas 92.

The processing and control circuits 80—referred to simply as the processing circuits 80—include receive (RX) and transmit (TX) processing circuits, which may be implemented in whole or in part in a baseband processor or other Digital Signal Processor (DSP). As noted, the additional processing circuits 64, e.g., CPU or other processing circuitry may be configured to run certain applications, including MTC applications representing machine type devices 16 supported by the UE 60. Correspondingly, the program and data memory storage 84 in this example stores a Root Identifier and one or more associated External Identifiers representing machine type devices 16 implemented by or through the UE 60. Note that the Root Identifier may be provisioned in the UE 60 and may be held in a secure memory device or element within the UE 60, and further note that the External Identifiers may be changed or updated based on signaling sent to the UE 60 from any HSS 62, MTC Server 66, or MTC Bootstrapping Server 68 involved in activating, deactivating, or otherwise modifying MTC service subscriptions and associated services for the machine type devices 16 associated with the UE 60.

Figure 9:
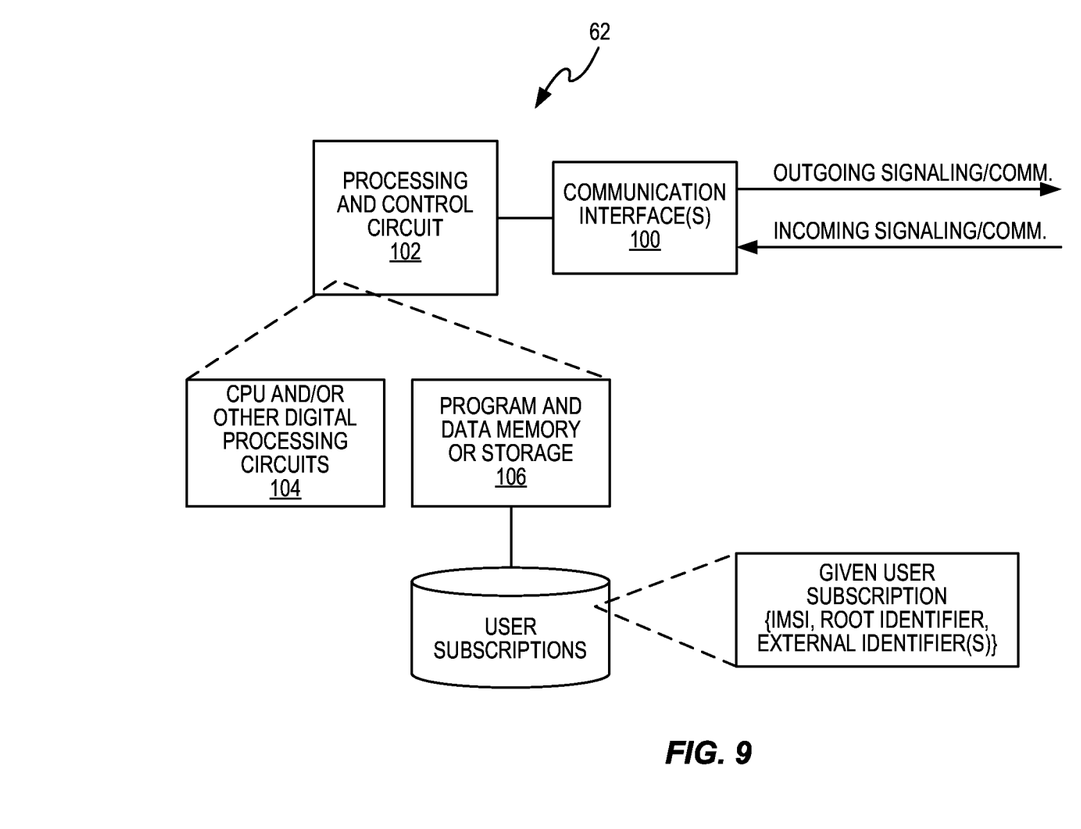
FIG. 9 is a block diagram of one embodiment of an HSS.

FIG. 9 illustrates an example embodiment of the above-described HSS 62. However, the diagram should be understood as being simplified for purposes of discussion, and as non-limiting with respect to the teachings herein.

The example HSS 62 includes one or more communication interfaces 100—e.g., for communicating with the MTC IWF 64—and processing and control circuits 102, which in one or more embodiments comprise a CPU or other computer/digital processing circuitry 104 configured to carry out the procedures taught herein. The processing and control circuits 102—referred to simply as processing circuits 102—include or are associated with program and data memory or storage 106, which are used to store user subscriptions, including associations between UE IMSIs and corresponding Root Identifiers, along with any of one or more External Identifiers associated therewith.

More generally, an example HSS 62 will be understood as comprising a computer system having specialized communication interfaces supporting defined communication protocols, and having secure storage/access for user subscriptions. In the context of this disclosure, the HSS's processing circuitry is configured to carry out certain processing and signaling in support of the automatic provisioning of External Identifiers for machine type devices 16 associated with given UEs 60, as explained in the foregoing example details. However implemented, the example HSS 62 will include or have access to persistent storage for user subscriptions, where the HSS 62 is configured to store Root Identifiers and associated External Identifiers in the user subscriptions, according to the teachings herein, and to support automatic provisioning of such.

For example, the HSS 62 is configured to perform a method that includes linking a Root Identifier to a user subscription in the 3GPP network, where the user subscription is used to authorize a UE 60 to connect to the 3GPP network and where the UE 60 is identified in the 3GPP network by an International Mobile Subscriber Identity (IMSI). The method further includes the HSS 62 receiving a message—e.g., a subscription activation, update or modification message—that includes the Root identifier and includes an External Identifier or requests generation of an External Identifier. The External Identifier used by an MTC Server 66 to identify an MTC device 16 that is configured to communicate with the MTC Server 66 through the 3GPP network via the UE 60.

The method further includes the HSS 62 identifying the linked user subscription from the Root Identifier and provisioning the user subscription with the external identifier.

Still further, the method includes the HSS 62 subsequently receiving a triggering communication for the MTC device 16, as identified by the External Identifier being included in the triggering communication, and identifying the IMSI of the UE 60 based on determining the user subscription of the UE 60 from the external identifier. From there, the method includes initiating a triggering communication toward the UE 60 using the IMSI. As such, it will be seen that the Root Identifier allows for the automatic provisioning (and updating) of MTC or other External Identifiers in the user subscriptions of the UEs 60 linked in the 3GPP network to those Root Identifiers.

Figure 10:
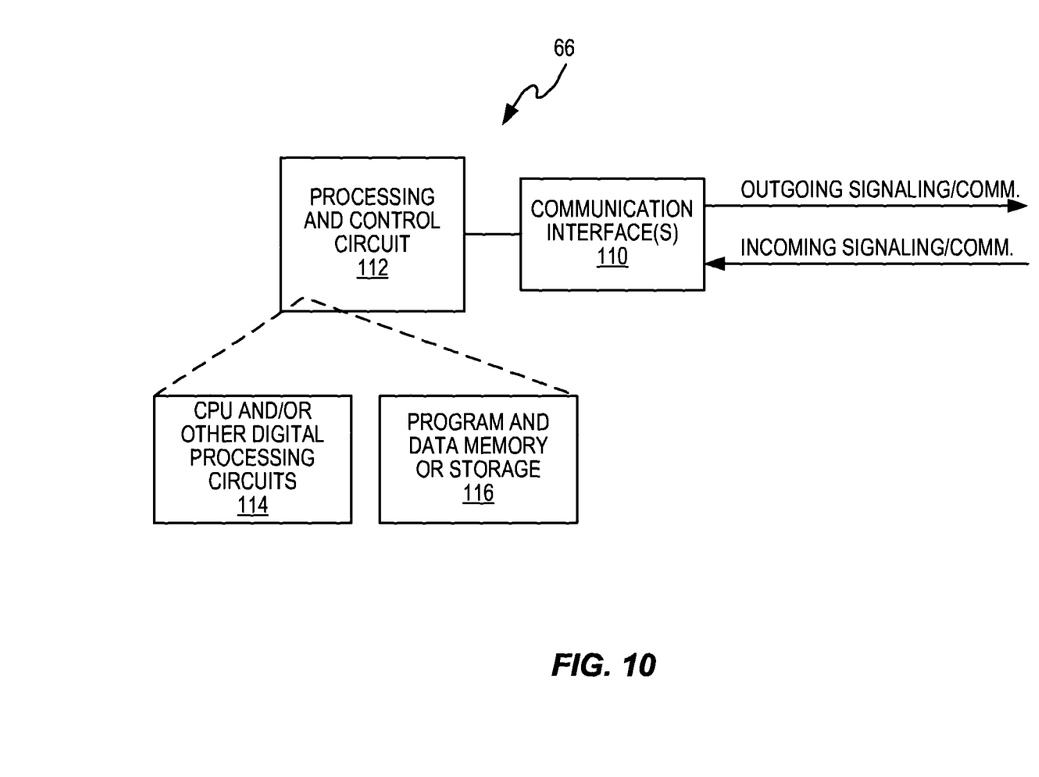
FIG. 10 is a block diagram of one embodiment of an MTC server.

FIG. 10 illustrates an example of an MTC Server 66 that is specially adapted according to the teachings herein. The diagram should be understood as being simplified for purposes of discussion, and as non-limiting with respect to the teachings herein.

As will be understood by those of ordinary skill in the art, an example MTC Server 66 comprises a computer system having specialized communication interfaces 110 supporting defined communication protocols, for communicating with a 3GPP network (e.g., through an MTC-IWF 64), for supporting M2M services for machine type devices 16 implemented in or coupled to UEs 60 that are attached to the 3GPP network. Further, according to the example details earlier herein, it will be understood that the MTC Server 66 in some embodiments is configured for communicating with an MTC Bootstrapping Server 68, e.g., to obtain External Identifiers for machine type devices 16 and/or to activate, deactivate, or otherwise modify MTC service subscriptions for such devices 16.

Thus, in the context of this disclosure, the MTC Server 66 includes processing and control circuits 112—referred to processing circuits 112 or processing circuitry 112. Such circuitry is configured to carry out certain processing and signaling in support of the automatic provisioning of External Identifiers for machine type devices 16 associated with given UEs 60, as explained in the foregoing example details. The processing circuitry 112 includes a CPU and/or other digital processing circuits 114, which are configured to implement the procedures taught herein for the MTC Server 66, and further includes or is associated with program and data memory or storage 116.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method performed by a Home Subscriber Server (HSS) operating in a network domain of a Third Generation Partnership Project (3GPP) network, the method comprising:
    receiving a subscription update request from a Machine Type Communication (MTC) server operating in a machine domain of an MTC network that is external to the 3GPP network;
    identifying a user subscription in the 3GPP network that is associated with a root identifier included in the subscription update request, based on stored information at the HSS that links the root identifier to the user subscription, said user subscription corresponding to a User Equipment (UE) authorized to use the 3GPP network and said root identifier being distinct from UE and subscriber identifiers used by the 3GPP network for identifying and authenticating the UE for communicative attachment of the UE to the 3GPP network;
    updating the user subscription with an external identifier included in or requested by the subscription update request, the external identifier identifying an MTC device or service within the machine domain of the MTC network and being separate and distinct from the UE and subscriber identifiers used by the 3GPP network for identifying and authenticating the UE, and said updating thereby linking the user subscription and corresponding UE to the MTC device or service identified by the external identifier, for use in communicatively coupling the MTC device or service with the MTC network via communicative attachment of the UE to the 3GPP network; and
    sending a subscription update confirmation to the MTC server, responsive to updating the user subscription.

2. A Home Subscriber Server (HSS) configured for operation in a network domain of a Third Generation Partnership Project (3GPP) network, the HSS comprising:
    a communication interface; and
    a processing circuit operatively associated with the communication interface and configured to:
        receive, via the communication interface, a subscription update request from a Machine Type Communication (MTC) server operating in a machine domain of an MTC network that is external to the 3GPP network;
        identify a user subscription in the 3GPP network that is associated with a root identifier included in the subscription update request, based on stored information at the HSS that links the root identifier to the user subscription, said user subscription corresponding to a User Equipment (UE) authorized to use the 3GPP network and said root identifier being distinct from UE and subscriber identifiers used by the 3GPP network for identifying and authenticating the UE for communicative attachment of the UE to the 3GPP network;
        update the user subscription with an external identifier included in or requested by the subscription update request, the external identifier identifying an MTC device or service within the machine domain of the MTC network and being separate and distinct from the UE and subscriber identifiers used by the 3GPP network for identifying and authenticating the UE, and said updating thereby linking the user subscription and corresponding UE to the MTC device or service identified by the external identifier, for use in communicatively coupling the MTC device or service with the MTC network via communicative attachment of the UE to the 3GPP network; and
        send, via the communication interface, a subscription update confirmation to the MTC server, responsive to updating the user subscription.

3. The method of claim 1, wherein the stored information links the root identifier to an International Mobile Subscriber Identity (IMSI), and wherein identifying the user subscription comprises the HSS determining the IMSI that is linked to the root identifier, according to the stored information.

4. The method of claim 1, wherein said steps of receiving and sending comprise receiving the subscription update request from the MTC Server via an MTC Inter-Working Function (MTC-IWF), and sending the subscription update confirmation to the MTC Server via the MTC-IWF.

5. The method of claim 1, further comprising, in advance of receiving the subscription update request, receiving linking information linking the user subscription and the root identifier, and storing the linking information at the HSS as the stored information.

6. The method of claim 5, further comprising receiving or otherwise determining the linking information based on a 3GPP attachment procedure involving the UE.

7. The method of claim 5, further comprising receiving the linking information from another database server in or coupled to the 3GPP network.

8. The method of claim 1, wherein updating the user subscription comprises adding the external identifier to the user subscription as a new or updated external identifier.

9. The method of claim 1, wherein, for the case that the HSS generated the external identifier, said step of sending the subscription update confirmation to the MTC Server includes sending the external identifier.

10. The HSS of claim 2, wherein the stored information links the root identifier to an International Mobile Subscriber Identity (IMSI), and wherein the processing circuit is configured to identify the user subscription by identifying the IMSI that is linked to the root identifier, according to the stored information.

11. The HSS of claim 2, wherein the processing circuit is configured to receive the subscription update request from the MTC Server and to send the subscription update confirmation to the MTC Server via an MTC Inter-Working Function (MTC-IWF).

12. The HSS of claim 2, wherein the processing circuit is configured to, in advance of receiving the subscription update request, receive linking information linking the user subscription and the root identifier, and store the linking information at the HSS as the stored information.

13. The HSS of claim 12, wherein the processing circuit is configured to receive or otherwise determine the linking information based on a 3GPP attachment procedure involving the UE.

14. The HSS of claim 12, wherein the processing circuit is configured to receive the linking information from another database server in or coupled to the 3GPP network.

15. The HSS of claim 2, wherein the processing circuit is configured to update the user subscription by adding the external identifier to the user subscription as a new or updated external identifier.

16. The HSS of claim 2, wherein, for the case that the processing circuit generated the external identifier, said processing circuit is configured to include the external identifier in the subscription update confirmation sent to the MTC.

* * * * *